United States Patent [19]
Sessler et al.

[11] 3,750,149
[45] July 31, 1973

[54] MULTI-UNIT ELECTRET TOUCH SELECTOR

[75] Inventors: Gerhard Martin Sessler, Summit; James Edward West, Plainfield; Alfred E. Hirsch, Jr., Summit, all of N.J.

[73] Assignee: Bell Telephone Laboratories, Incorporated, Murray Hill, N.J.

[22] Filed: Jan. 18, 1972

[21] Appl. No.: 218,726

[52] U.S. Cl. .................. 340/365 C, 29/25.42, 310/2
[51] Int. Cl. .............................................. H04l 15/06
[58] Field of Search ................................ 340/365 C

[56] References Cited

UNITED STATES PATENTS 3,653,038 3/1972 Webb .............................. 340/365 C
3,668,698 6/1972 Demirdjioghlou ............. 340/365 C

*Primary Examiner*—Thomas B. Habecker
*Attorney*—W. L. Keefauver et al.

[57] ABSTRACT

Keyboard switching arrangements have been described that employ a plurality of independent back electrodes, supported at defined touch locations, and a single sheet of foil electret material supported in close proximity to the back electrodes. As the foil is subjected to a tactile force at one of the touch locations, it is displaced to generate a signal in a circuit connected to the electrode associated exclusively with that touch location.

17 Claims, 4 Drawing Figures

MULTI-UNIT ELECTRET TOUCH SELECTOR

According to the present invention, each selector position is arranged to produce a distinct analog signal in a common output circuit. For example, different charge levels in the electret, different gap spacings, or different electrode areas, at different touch locations, are used to produce signals with different amplitudes. A touch selector fabricated in accordance with this invention, therefore, requires only one output circuit and is considerably easier to manufacture and control.

This invention relates to signalling apparatus and more particularly to key selector apparatus responsive to tactile forces. It has for its principal object the improvement of touch selectors through a simplification of their mechanical construction, the elimination of multiple electrical contacts, an avoidance of ohmic contacts, and an increase in reliability. Other objects are a reduction of size and cost, and the generation of an output signal that may be used without additional detection or processing.

BACKGROUND OF THE INVENTION

Numerous signalling operations require the generation of voltage pulses or tone signals according to a prescribed code. For example, the conventional telephone instrument employs a dial arrangement which actuates metallic contacts to interrupt a source of current in the production of sequences of binary pulses. Pushbutton selectors used on modern telephones mechanically establish circuits which initiate the generation of multitone signals. Pushbutton controllers have gained an additional degree of importance as input devices for electronic calculators and the like.

As with all mechanical switching arrangements, however, ohmic contacts occasionally become contaminated and fail. More importantly, mechanical arrangements are relatively heavy and bulky, exhibit high inertia, and, because of the precision required for their fabrication, contribute significantly to the total cost of the signalling arrangement.

DESCRIPTION OF THE PRIOR ART

To avoid the difficulties inherent in mechanical dial or button selectors, a variety of alternative switching arrangements have been developed to exploit the properties of semiconductors, Hall effect elements, light emitting diodes, and so on. One of the most promising arrangements relies on the unique properties of a thin electrostatically charged film membrane. When such a charged film is provided with a conductive coating on one of its surfaces, it is generally known as a "metallized foil electret," or simply as a "foil electret." Electrets exhibit a permanent charge and, when employed in a transducer-like configuration, permit sizable output signals to be developed in response to a relative displacement between the foil and a conductive backplate.

An improved touch signalling arrangement which employs a foil electret is disclosed in a copending application of G. M. Sessler, R. L. Wallace and J. E. West, Ser. No. 101,536, filed Dec. 28, 1970, now U.S. Pat. No. 3,668,417. It employs a plurality of separated conductive elements supported in an insulating member. All of the elements are covered by one or more foil electrets held a slight distance away from the conductive elements and from each other. A front cover, equipped, for example, with apertures of finger size, or with pushbuttons, or the like, is supported in alignment with the conductive elements. As the foil electret is displaced by an applied tactile force, a signal pulse is produced in an output circuit connected exclusively to the associated conductive element. The signal is sufficient to actuate an auxiliary oscillator, switching element, trigger circuit, or the like. The arrangement is extremely compact, simple to implement, and has been found to be very reliable. Yet, for a switching array that employs a large number of touch locations, a separate external circuit is required for each touch location. Fabrication of the unit is thus somewhat complex and a considerable network of external circuits is required.

It is, therefore, another object of this invention to simplify the construction of an electret touch sensitive selector and to increase its versatility.

SUMMARY OF THE INVENTION

In accordance with this invention, an electret touch sensitive selector includes one or more electret foils supported in spaced juxtaposition to a backplate configuration, and an arrangement, such as an apertured cover plate or a system of pushbuttons, to direct applied tactile forces to discrete touch locations on the foil. The backplate configuration includes a conductive element substantially aligned with each touch location. As the electret foil is displaced, in response to a tactile force applied at one of the touch locations, a signal that uniquely identifies that location is developed in a circuit connected in common to all of the conductive elements. Thus, touch locations are identified in this invention by signal character instead of by the address of signal origin. This is in distinct contrast to prior systems wherein each touch location gives rise to a signal in a circuit associated exclusively with one touch location.

It is, thus, in accordance with this invention to control the electrostatic condition at each touch location of a selector array to assure that signals delivered from each location to a common output circuit uniquely identify the source location. In one embodiment of the invention, the signal developed at each touch location is given a different unique character by establishing a different charge density, or charge densities of opposite polarity, in the electret foil at that location. The backplate may thus be configured to support conductive elements of equal size at a uniform distance from the foil. The foil may be charged to different densities in parallel stripes, in a checkerboard array, or in any pattern required by the touch location distribution of the selector. Since the conductive elements are uniformly sized and spaced, and are all connected to a common output circuit, they may, if desired, be merged into a unitary conductive backplate member.

In accordance with another embodiment of the invention, a uniformly charged electret foil is used and signals uniquely characteristic of each touch location are developed by selectively adjusting the effective size of the conductive element of the backplate at each touch location, its spacing from the electret foil at that location, or the like. Each conductive element may be proportioned in area or spacing from the electret, or the electret foil thickness may be proportioned to establish the condition necessary to produce a signal characteristic of a touch location in the common output circuit. In effect, the capacitance between the foil electret and the conductive element at a touch location is uniquely selected to produce in a common output circuit, in response to a displacement of the electret foil, a signal whose amplitude is unique to that touch location.

Of course, two or more different configurations may be used in a single selector to increase the number of identifiable signals available and, hence, to increase the number of usable touch locations. Suffice it to say, a touch selector using any of the arrangements discussed above develops a signal uniquely characteristic of a touch location in a common output circuit. By using several coding arrangements in one selector, great versatility is achieved and a great number of identifiable touch locations are established.

The invention will be more fully apprehended from the following description of preferred illustrative embodiments thereof taken together with the appended drawings.

DETAILED DESCRIPTION OF THE INVENTION

Figure 1:
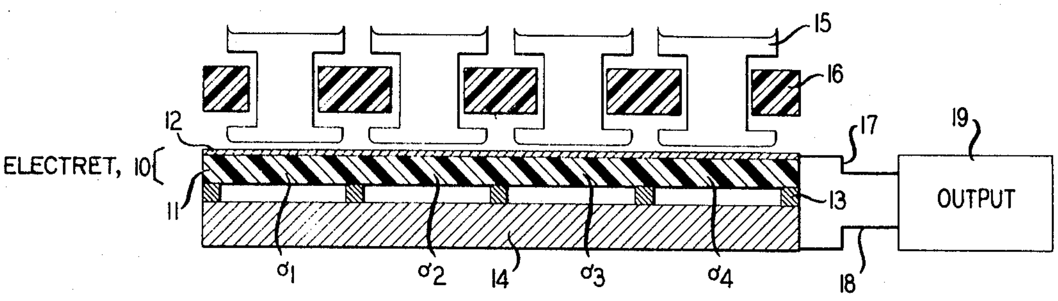
FIG. 1 illustrates, by way of a cross section view, a touch selector of the invention which employs a foil electret with a discrete charge density at each touch location.
Figure 2:
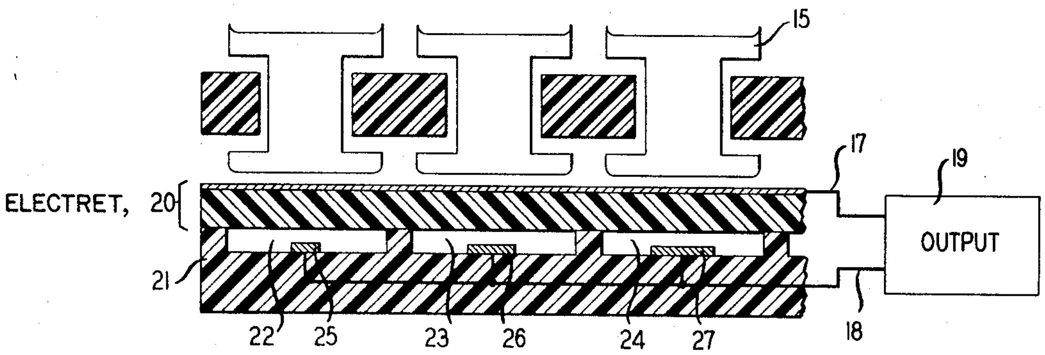
FIG. 2 illustrates, in cross section, a touch selector in accordance with the invention in which characteristic signals are developed by means of a controlled electrostatic condition between an electret foil and each backplate element.
Figures 3, 4:
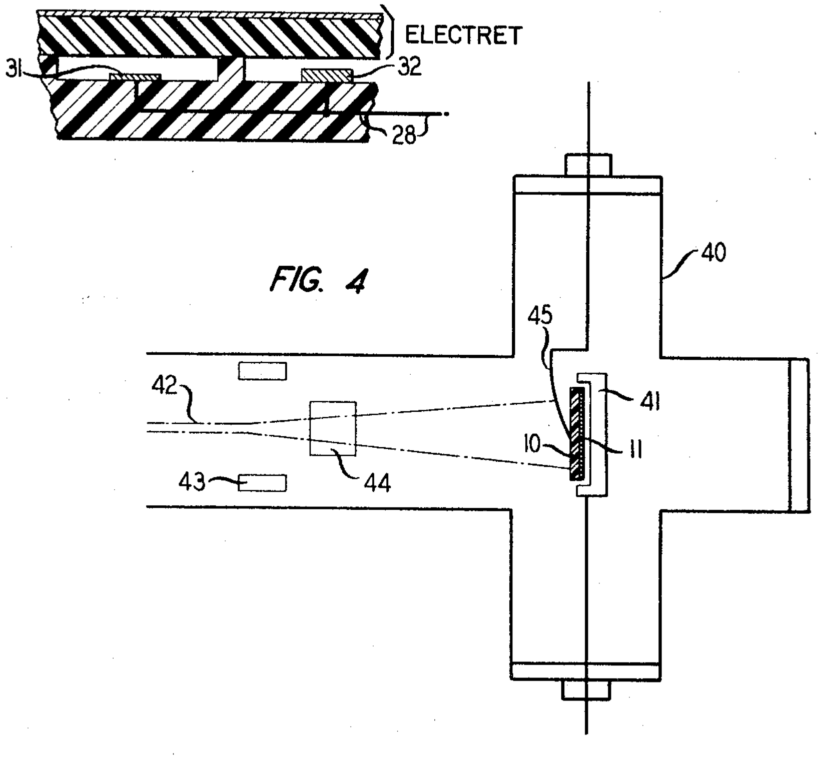
FIG. 3 illustrates, in cross section, another touch selector arrangement according to the invention.
FIG. 4 illustrates apparatus for selectively charging a metallized film to produce an electret foil suitable for use in the practice of the invention.

FIGS. 1 through 3 illustrate, by way of cross sectional views, the construction of a touch selector in accordance with this invention. Each selector includes a foil electret supported in spaced juxtaposition to a backplate configuration and an arrangement to direct applied tactile forces to discrete touch locations on the foil. The backplate system is equipped with selectively positioned conductive elements, all connected to a common output circuit. The effective geometric and electrostatic conditions established between the foil and a conductive element of the backplate configuration are controlled, in accordance with the invention, to yield a signal of different character in the common output circuit in response to a tactile force applied to each touch location. Mechanically, the selector of this invention may be similar to the selector described in the copending application, Ser. No. 101,536.

In the selector arrangement illustrated in FIG. 1, the character of the signal developed at each touch location is determined by the charge density of the electret foil at the location. Foil electret 10, which may include a thin film 11 of a polymer dielectric or other plastic material with a thin metallic layer 12 on its outer surface, is charged to different densities, $\sigma_1$, $\sigma_2$, $\sigma_3$, and $\sigma_4$ at defined touch locations, and is supported in spaced juxtaposition to a conductive backplate configuration 14, for example, by means of spacers 13. As foil electret 10 is displaced, for example, by the application of a tactile force at a touch location, a signal $V_t$ of characteristic amplitude is developed between the conductive element of backplate 14 at that location and the metallic layer 12 of the electret. The charge densities $\sigma$ for different touch locations on the foil may be selected to yield signals of any desired amplitude distribution in the common output circuit. It may be advantageous to condition the several touch locations to produce signals in a defined amplitude pattern, e.g., *n* different signals quantized in *n* steps, where *n* defines the number of touch locations in the selector. By this expedient, the output signal is in quantized, digital form and, for some applications, may be used directly and without further analysis or processing.

Similarly, by establishing different charge polarities at different touch locations, the phase of the output signal may be used to characterize the origin of the signal. Both the amplitude and the phase of the signal may, of course, be controlled in the same selector array to increase its versatility. Characteristic signals are delivered by means of conductive leads 17 and 18 together to an external output unit 19.

Since signal amplitude at a touch location is determined in this embodiment of the invention by charge density of the foil, backplate configuration 14 may be a unitary conductive member. Discrete conductive elements on a substrate, or the like, connected in common to lead 18, may, of course, be employed if desired.

The several touch locations on the selector may be established entirely by the use of spacers 13, or the like, or may be established by a system of touch guides, for example, in the form of an apertured cover plate, or, as shown in FIGS. 1 and 2, by a system of pushbuttons 15 held in place by support elements 16. Use of pushbuttons, or the like, insures a reproducible area of deflection of the foil independent of finger size. As described in detail in the above-cited copending application, each push-button may be provided with a restoring force that urges it to return to its quiescent location when released. This force may be supplied by the tension of the foil itself or by other means, not shown.

A foil electret with a pre-established charged distribution laterally over its surface has been described in the art and may be prepared, for example, as described hereinafter. In an example of practice of the invention, a foil electret for use in a multitouch selector was prepared from a 1 mil (25.4 $\mu$m) thin film of polyfluoroethylene-propylene plastic material, marketed commercially under the tradename TEFLON FEP, with a 1,000 A. metallic layer 12 on one of its surfaces. For this unit, 1 cm wide stripes were charged to different charge densities. These values are typical, but it will be apparent that foil and metallic layer thicknesses may vary depending on the usage and environmental conditions. The prepared foil was employed in a configuration similar to that illustrated in FIG. 1, in which a unitary backplate was used which had on its surface ridges 13 of generally circular shaped, 100 $\mu$m high, 0.8 cm in diameter, and spaced about 1 cm center-to-center. Since the electric field at touch locations of the unit is determined by the charge distribution in the foil, spacers 13 were conveniently formed as part of the backplate configuration.

In the embodiment of the invention illustrated in FIG. 2, a uniformly charged electret foil 20 is held in spaced relation to a backplate configuration 21, for example, in the form of an insulating substrate formed with a number of ridges on its surface. The ridges serve to establish a number of recesses 22, 23, 24, . . . , in substantial alignment with pushbuttons 15 supported at different touch locations. A plurality of individual conductive electrodes 25, 26, 27, . . . , are associated with the insulating substrate, one electrode being positioned substantially in the center of each recess. The electrodes may, if desired, be embedded in, or deposited on the substrate. By employing electrodes with different areas, as shown in FIG. 2, or with different thicknesses, as shown at 31 and 32 in FIG. 3, and by employing an electret foil of uniform charge distribution, output signals of characteristic amplitudes are produced at different touch locations. To achieve a desired gap spacing, the height of spacer 13 (FIG. 3) may be varied instead of the thickness of electrodes 31, 32. If desired, the area, thickness, or shape of the conductive electrodes, or the effective gap between the electrodes and foil, may be altered in selected combinations to increase the number of defined touch locations or otherwise to satisfy a design requirement.

Whatever the electrode arrangement, all electrodes are connected together via a common output conductive lead 18. Signals developed in the circuit including lead 18 and lead 17, connected to the metallized layer of foil 20, are delivered to output unit 19. Thus, as the electret foil is displaced in response to a tactile force, a signal with a distinctly different character is developed at each touch location and delivered via the common output circuit to a utilization device.

In operation, a selector is actuated by touching the electret foil, or a pushbutton which depresses the foil, at a predetermined location. An expression for the voltage $V_i(t)$, generated by a touch expression, is set forth in the above-cited copending application. It is there shown that $$V_i(t) = A_i \int_{-T}^{T} \dot{s}(\lambda) e^{-(t-\lambda)/RC} d\lambda \qquad (1)$$

where $A_i$ represents the ratio of voltage generated by the electret foil source to the average displacement of the foil. For the selectors of this invention, $$A_i = [\sigma_i D/(D+\epsilon d)\epsilon_o]\ (C_i/C). \qquad (2)$$

In Equations 1 and 2, $s(t)$ is the derivative of the displacement function of the foil as function of time $t$, R is the input resistance of the amplifier, $C_i$ is the partial capacitance of the foil-backplate arrangement corresponding to the touched location, $$C = \sum_i C_i$$

is the total capacitance of the foil-backplate arrangement, $\sigma_i$ is the effective charge density of the electret on its non-metallized surface, D and $d$ are the thicknesses of the electret and air layer, respectively, $\epsilon$ is the dielectric constant of the electret material and $\epsilon_o$ is the permittivity of free space.

For the same displacement, the individual units of the selectors shown in FIGS. 1 and 2 generate, therefore, output signals proportional to $\sigma_i$ and $C_i$, respectively. The output signals differ in two respects from those of a subdivided-backplate design: (1) the amplitude of the output signals is smaller by a factor $C_i/C$ due to loading of the partial capacitance $C_i$ by the total capacitance C, (2) the RC constant is for the same reason greater by a factor $C/C_i$.

Further, as discussed in the copending application, the output voltage is proportional to the foil displacement and independent of the risetime Δt of the displacement function as long as $\Delta t << RC$. Due to the relatively small restoring force of thin polymer foils, the displacement is constant and equal to the thickness of the air gap for touching pressures exceeding a minimum value. For such pressures the risetime $\Delta t$, which decreases with increasing touching pressure, is smaller than RC as long as R is selected large enough. Thus, the output voltage is independent of touching pressure.

The foil electret used in any of the selector arrangements of the invention preferably is charged by means of an electron beam scanning arrangement, for example, as shown schematically in FIG. 4 and as described more fully in a copending application of G. M. Sessler and J. E. West (Case 8—8), filed Nov. 2, 1970, Ser. No. 85,883. According to this method of charging, a plastic film 10 with a thin conductive layer 11 is supported for electron bombardment in an evacuated chamber 40. Preferably, it is held in front of a conductive electrode 41. An electron beam 42, operating at a potential of about 20 keV, is directed at the foil and deflected in a raster-like pattern by vertical and horizontal electrodes 43 and 44, suitably positioned and energized.

To produce an electret foil with a characteristic lateral charge distribution, for example, as parallel rows with different charge densities, the foil is shielded from beam 42 by a conductive shutter 45, whose thickness is much greater than the range of the electron beam. Shield 45 is spaced a small distance from the foil to prevent contact with it. Initially, the shield is positioned so that only a one cm stripe is exposed to the beam. It is then moved progressively across the surface of the foil, about one cm at a time and the foil is subjected to electron beam exposure in each position. The process is repeated as often as desired to develop an electret foil with distinctly charged areas.

A two-dimensional pattern of charge densities may also be made by either rotating the foil 90° between two charging cycles, as described above, or by using a double shield arrangement. Alternatively, a foil may be exposed to a scanned electron beam through an apertured screen (not shown) to produce individual charged areas in a grid-like configuration. Foil electrets have been charged in practice by exposure through a screen with holes approximately 0.3 mm in diameter, with the holes spaced from one another by about 0.1 mm.

Tests have shown that there is essentially no macroscopic migration of charge on an electret foil. Further, it has been found that foils with a resolution of over 100 lines per cm can be produced. Although resolution of this order is not required in most touch selector arrangements, it may be used to advantage in other applications. Further, it has been shown that uniformity of charge density to within ±5 percent over a range of an order of magnitude is typical of electret foils charged by the electron beam method. Moreover, stable foil electrets with predetermined charge distributions may be prepared.

It will, of course, be recognized that a touch selector in accordance with the invention may employ an electret foil prepared by other charging arrangements. Further, it will be apparent that multiple foils may be employed in a selector unit and that a variety of different arrangements may be used for coding the output signal developed at each location. Various other arrangements and configurations will also occur to those skilled in the art.

What is claimed is:

1. A multi-unit electret touch selector wherein a backplate with an array of conductive electrodes at defined touch locations and a spaced-apart foil electret are supported together in a transducer-like configuration for delivering a signal to an external circuit to indicate a tactile displacement of said foil electret with relation to said backplate at an identified one of said touch locations, characterized by, said foil being structurally associated with said conductive electrodes to establish a separate prescribed electrostatic condition between said foil electret and the conductive electrode of said backplate at each touch location, to yield, in response to a tactile force applied to one of said touch locations, a signal of a character unique to that location.

2. A multi-unit electret touch selector as defined in claim 1, wherein, said separate prescribed electrostatic condition at each touch location is established by said foil electret having a preselected charge density distribution.

3. A multi-unit electret touch selector as defined in claim 1, wherein, said separate prescribed electrostatic condition at each touch location is established by the geometric arrangement between said foil electret and said conductive electrodes, said geometric arrangement establishing a different effective capacitance at each touch location.

4. A multi-unit electret touch selector wherein a backplate with an array of conductive electrodes at defined touch locations and a spaced-apart foil electret are supported together in a transducer-like configuration for delivering a signal to an external circuit to indicate a tactile displacement of said foil electret with relation to said backplate at an identified one of said touch locations, characterized by, said foil being structurally associated with said conductive electrodes to establish a separate prescribed electrostatic condition between said foil electret and the conductive electrode of said backplate at each touch location, to yield, in response to a tactile force applied to one of said touch locations, a signal of a character unique to that location, and by an output circuit, electrically common to each of said conductive electrodes responsive to said signal.

5. A multi-unit, touch-sensitive signaling device which comprises, a backplate, a metallized electret film supported in spaced juxtaposition to said backplate, means for directing externally applied tactile forces to selected touch locations on said film, a conductive element selectively associated with said backplate member at each of said touch locations to establish a prescribed electrostatic condition at each of said locations, such that the prescribed electrostatic condition at any one of said touch locations is unlike the electrostatic condition at any other of said touch locations, and circuit means, electrically common to each of said conductive elements, for delivering to an external circuit that signal developed between said electret film and said conductive element at a touch location in response to a tactile displacement of said film at said touch location, the characteristics of said signal uniquely defining that touch location subject to said tactile displacement.

6. A multi-unit, touch-sensitive signaling device, as defined in claim 5, wherein, said prescribed electrostatic condition at each of said touch locations is established essentially by the charge density of said electret film at said touch location.

7. A multi-unit, touch-sensitive signaling device, as defined in claim 5, wherein, said prescribed electrostatic condition at each of said touch locations is established essentially by the polarity of charge of said electret film at said touch location.

8. A multi-unit, touch-sensitive signaling device, as defined in claim 5, wherein, said prescribed electrostatic condition at each of said touch locations is established essentially by the effective capacitance between said electret film and said conductive element at said touch location.

9. A multi-unit, touch-sensitive signaling device, as defined in claim 5, wherein, said prescribed electrostatic condition at each of said touch locations is established essentially by the physical dimensions of said conductive element at said touch location.

10. A multi-unit, touch-sensitive signaling device, as defined in claim 5, wherein, said prescribed electrostatic condition at each of said touch locations is established essentially by the thickness of the said electret film at said touch location.

11. A multi-unit, touch-sensitive signaling device, as defined in claim 5, wherein, said prescribed electrostatic condition at each of said touch locations is established essentially by the relative spacing between said electret film and said conductive element at said touch location.

12. A multi-unit, touch-sensitive signaling device as defined in claim 5, wherein, said signal developed by the said electret film and said conductive element at a touch location in response to a tactile displacement of said film is characterized by its amplitude.

13. A multi-unit, touch-sensitive signaling device as defined in claim 5, wherein, said signal developed by the said electret film and said conductive element at a touch location in response to a tactile displacement of said film is characterized by its polarity.

14. A mutli-nut, touch-sensitive signaling device as defined in claim 5, wherein, said signal developed by the said electret film and said conductive element at a touch location in response to a tactile displacement of said film is characterized by its amplitude and polarity.

15. A multi-unit, touch-sensitive signaling device as defined in claim 5, wherein, said signal developed by the said electret film and said conductive element at a touch location in response to a tactile displacement of said film is characterized by one of *n* different amplitude levels, where a different one of said *n* levels represents each of said touch locations.

16. A multi-unit, touch-sensitive signaling device as defined in claim 5, wherein, said conductive elements comprise discrete conductors associated with said backplate.

17. A multi-unit, touch-sensitive signaling device as defined in claim 5, wherein, said conductive elements comprise assigned portions of a conductive backplate.

* * * * *